(12) United States Patent
Carter et al.

(10) Patent No.: US 9,781,154 B1
(45) Date of Patent: Oct. 3, 2017

(54) SYSTEMS AND METHODS FOR SUPPORTING INFORMATION SECURITY AND SUB-SYSTEM OPERATIONAL PROTOCOL CONFORMANCE

(71) Applicant: ORACLE INTERNATIONAL CORPORATION, Redwood City, CA (US)

(72) Inventors: Stephen R. Carter, Spanish Fork, UT (US); Lee Edward Lowry, Orem, UT (US); Paul Alexandre Turner, Sandy, UT (US); Robert Mark Ward, Highland, UT (US); Lloyd Leon Burch, Payson, UT (US); Dale Robert Olds, Draper, UT (US); Duane Fredrick Buss, West Mountain, UT (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/275,931

(22) Filed: Sep. 26, 2016

Related U.S. Application Data

(63) Continuation-in-part of application No. 10/404,495, filed on Apr. 1, 2003, now abandoned, and a continuation-in-part of application No. 11/225,993, filed on Sep. 14, 2005, and a continuation-in-part of application No. 11/638,121, filed on Dec. 13, 2006, which is a continuation-in-part of application No. 11/225,993, filed on Sep. 14, 2005, and a continuation-in-part of application No. 11/225,994, filed on Sep. 14, 2005, now Pat. No. 8,281,374.

(51) Int. Cl.
*G06F 21/44* (2013.01)
*H04L 29/06* (2006.01)
*H04W 12/06* (2009.01)

(52) U.S. Cl.
CPC ........ *H04L 63/1441* (2013.01); *H04L 63/083* (2013.01); *H04L 63/10* (2013.01); *H04L 63/1416* (2013.01); *H04W 12/06* (2013.01)

(58) Field of Classification Search
CPC ........................ H04L 63/083; H04L 63/1441
See application file for complete search history.

(56) References Cited

U.S. PATENT DOCUMENTS

| 5,813,009 A | 9/1998 | Johnson et al. |
| 5,918,210 A | 6/1999 | Rosenthal et al. |

(Continued)

OTHER PUBLICATIONS

U.S. Appl. No. 10/404,405, Advisory Action mailed on Mar. 10, 2010, 2 pages.

(Continued)

*Primary Examiner* — William Powers
(74) *Attorney, Agent, or Firm* — Kilpatrick Townsend & Stockton LLP

(57) ABSTRACT

Systems and methods are described that support information security and sub-system operational conformance with protocols. In some embodiments, agent access to resources can be controlled via generation of credentials and/or tokens and/or conditioned external authentication. In some embodiments, workflows used to assess protocol conformance can be conditionally triggered at sub-systems.

20 Claims, 10 Drawing Sheets

(56) References Cited

U.S. PATENT DOCUMENTS

| | | | |
|---|---|---|---|
| 5,924,077 A | 7/1999 | Beach et al. | |
| 6,029,144 A * | 2/2000 | Barrett | G06Q 99/00 |
| | | | 235/375 |
| 6,067,525 A | 5/2000 | Johnson et al. | |
| 6,308,163 B1 | 10/2001 | Du et al. | |
| 6,471,521 B1 | 10/2002 | Dornbush et al. | |
| 6,704,728 B1 | 3/2004 | Chang et al. | |
| 6,735,701 B1 * | 5/2004 | Jacobson | H04L 29/06 |
| | | | 726/1 |
| 6,820,135 B1 | 11/2004 | Dingman et al. | |
| 6,944,183 B1 | 9/2005 | Iyer et al. | |
| 7,219,142 B1 | 5/2007 | Parekh et al. | |
| 7,734,754 B2 * | 6/2010 | Dougherty | G06F 21/55 |
| | | | 709/223 |
| 8,316,237 B1 * | 11/2012 | Felsher | H04L 9/0825 |
| | | | 380/282 |
| 2001/0051906 A1 | 12/2001 | Esposito | |
| 2001/0052012 A1 | 12/2001 | Rinne et al. | |
| 2002/0107875 A1 | 8/2002 | Seliger et al. | |
| 2002/0120917 A1 | 8/2002 | Abrari et al. | |
| 2002/0147801 A1 * | 10/2002 | Gullotta | G06F 21/6218 |
| | | | 709/223 |
| 2002/0156785 A1 | 10/2002 | Kumar et al. | |
| 2002/0160347 A1 | 10/2002 | Wallace et al. | |
| 2002/0169876 A1 * | 11/2002 | Curie | G06Q 10/06 |
| | | | 709/226 |
| 2002/0186844 A1 | 12/2002 | Levy et al. | |
| 2003/0115179 A1 | 6/2003 | Prabakaran et al. | |
| 2003/0115246 A1 * | 6/2003 | Mahon | H04L 29/12216 |
| | | | 709/200 |
| 2003/0126464 A1 * | 7/2003 | McDaniel | G06F 21/604 |
| | | | 726/4 |
| 2003/0130931 A1 * | 7/2003 | Mirlas | G06Q 40/04 |
| | | | 705/37 |
| 2003/0149599 A1 | 8/2003 | Goodall et al. | |
| 2003/0153991 A1 | 8/2003 | Visser et al. | |
| 2004/0044730 A1 | 3/2004 | Gockel et al. | |
| 2004/0107118 A1 | 6/2004 | Harnsberger et al. | |
| 2004/0162833 A1 | 8/2004 | Jones et al. | |
| 2004/0177326 A1 | 9/2004 | Bibko et al. | |
| 2005/0027845 A1 * | 2/2005 | Secor | G06Q 10/087 |
| | | | 709/223 |
| 2005/0228688 A1 | 10/2005 | Visser et al. | |

OTHER PUBLICATIONS

U.S. Appl. No. 10/404,495, Restriction Requirement mailed on Jan. 23, 2008, 6 pages.

U.S. Appl. No. 10/404,495, Non-Final Office Action mailed on May 9, 2008, 9 pages.

U.S. Appl. No. 10/404,495, Final Office Action mailed on Nov. 25, 2008, 11 pages.

U.S. Appl. No. 10/404,495, Advisory Action mailed on Feb. 6, 2009, 2 pages.

U.S. Appl. No. 10/404,495, Non-Final Office Action mailed on May 28, 2009, 16 pages.

U.S. Appl. No. 10/404,495, Final Office Action mailed on Dec. 28, 2009, 18 pages.

U.S. Appl. No. 10/404,495, Advisory Action mailed on Mar. 10, 2010, 2 pages.

U.S. Appl. No. 10/404,495, Non-Final Office Action mailed on Jun. 20, 2013, 17 pages.

U.S. Appl. No. 10/404,495, Final Office Action mailed on Jan. 15, 2014, 14 pages.

U.S. Appl. No. 10/404,495, Non-Final Office Action mailed on Oct. 22, 2015, 28 pages.

U.S. Appl. No. 10/404,495, Final Office Action mailed on May 6, 2016, 35 pages.

* cited by examiner

SYSTEMS AND METHODS FOR SUPPORTING INFORMATION SECURITY AND SUB-SYSTEM OPERATIONAL PROTOCOL CONFORMANCE

CROSS REFERENCE TO RELATED APPLICATIONS

The present application is a continuation-in-part of U.S. Nonprovisional patent application Ser. No. 10/404,495, filed Apr. 1, 2002. The present application is also a continuation-in-part of U.S. Nonprovisional patent application Ser. No. 11/225,993, filed Sep. 14, 2005. The present application is also a continuation-in-part of U.S. Nonprovisional patent application Ser. No. 11/638,121, filed Dec. 13, 2006, which is a continuation-in-part of U.S. Nonprovisional patent application Ser. No. 11/225,993, filed Sep. 14, 2005 and is also a continuation-in-part of U.S. Nonprovisional patent application Ser. No. 11/225,994, filed Sep. 14, 2005.

FIELD

The present disclosure relates generally to supporting information security and sub-system operational conformance with protocols. More specifically, agent access to resources can be controlled via generation of credentials and/or tokens and/or conditioned external authentication and/or workflows to assess protocol conformance can be conditionally triggered at sub-systems.

BACKGROUND

System operations can be compromised via such events, such as unauthorized access or system failures. For example, an access request may include a credential that is determined to indicate that resource access is to be granted, but the credential may not, in fact, be authorized to be used in a given context or for a device or user associated with the request. In an sufficient realization of the constraints may result in a device or user gaining access to secure information and/or potentially with a permission to modify system information. As another example, a subset of a collection of servers may operate in accordance with a rule that addresses particular network issues encountered by the subset. However, the rule may be configured such that an effect of implementation of the rule compromises a target outcome for the collection of servers as a whole.

SUMMARY

In some embodiments, a computer-implemented method for facilitating information security and sub-system operational conformance of protocols is provided. A protocol is identified that includes one or more parameter constraints pertaining to operation of a system. A plurality of sub-systems within the system is identified. Each sub-system of the plurality of sub-systems is configured to perform different types of operations via access to and usage of different resources. For each sub-system of the plurality of sub-systems, an implementation of the protocol is generated. The implementation of the protocol defines a workflow that is to occur in response to a detection at the sub-system of a defined event. The defined event corresponds to a device interaction or data change. One or more device interactions or data changes that corresponds to the defined event are detected. In response to the detection, the workflow is performed. Performing the workflow includes retrieving one or more processing definitions corresponding to the workflow from a data store and generating one or more queries based on the one or more processing definitions and based on the event. Performing the workflow further includes receiving one or more responses to the one or more queries and storing, in a data log for the sub-system, the one or more responses in association with data corresponding to the event. Based on the data log, it is determined whether a violation of the protocol has occurred. When it is determined that a violation of the protocol has occurred, an alert is generated that identifies the sub-system and is indicative of a violation of the protocol having occurred.

In some embodiments, a computer-program product is provided that is tangibly embodied in a non-transitory machine-readable storage medium. The computer-program product can include instructions configured to cause one or more data processors to perform part or all of a method disclosed herein. In some embodiments, a system is provided for facilitating information security and sub-system operational conformance of protocols. The system can include one or more data processors and a non-transitory computer readable storage medium containing instructions which, when executed on the one or more data processors, cause the one or more data processors to perform part or all of a method disclosed herein.

The following detailed description together with the accompanying drawings will provide a better understanding of the nature and advantages of the present disclosure.

BRIEF DESCRIPTION OF THE DRAWINGS

Illustrative embodiments of the present invention are described in detail below with reference to the following drawing figures.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Figure 1:
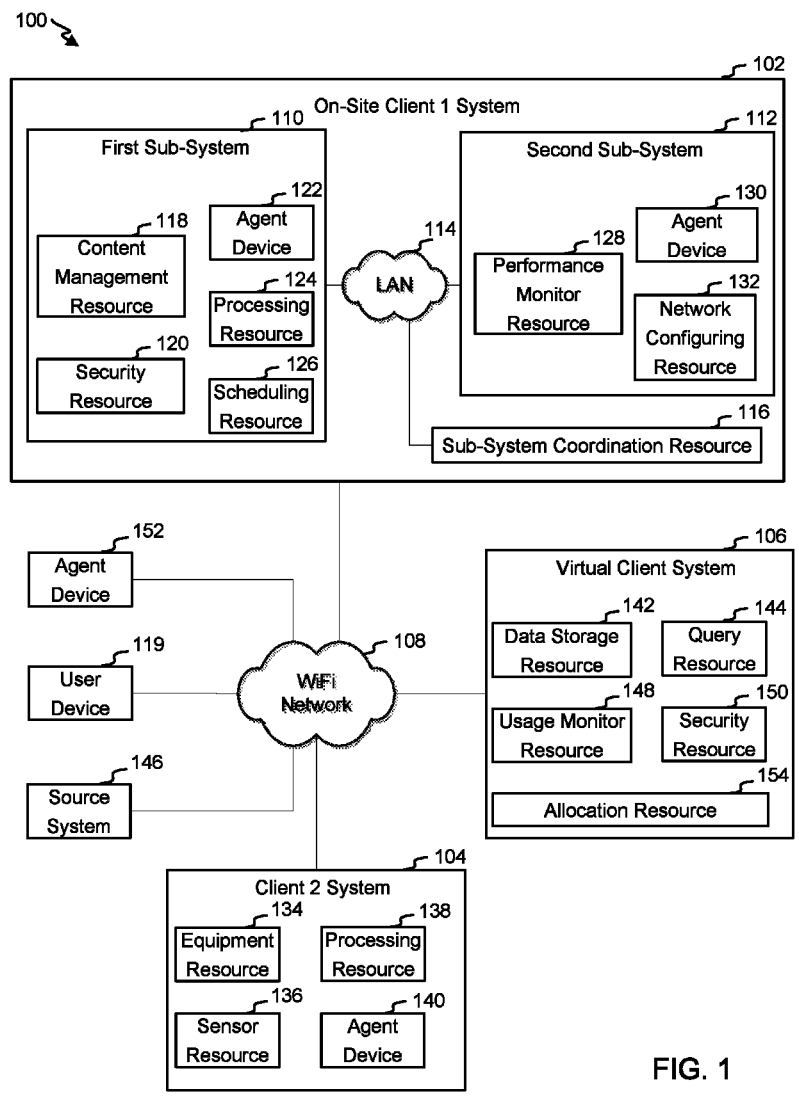
FIG. 1 shows an example network for controlling resource access and operation across sub-systems and/or systems.

FIG. 1 shows an example network 100 for controlling resource access and operation across sub-systems and/or systems. Network 100 includes systems corresponding to multiple clients and to multiple locations. More specifically, each of on-site client 1 system 102, virtual client system 106 and client 2 system 104 can correspond to a set of devices and/or other components, such as one or more servers (e.g., and/or server farms or server clusters), user devices (e.g., desktop computers, laptops, tablets, or smart phones), data storage devices (e.g., network-attached storage), and/or equipment. The set of devices and/or other components can, in some instances (e.g., for on-site client 1 system), be co-located, such as being located within one or more buildings or geographical areas associated with the client. In some instances, the clients need not be co-located but are connected via a network (e.g., a private network). In instances where different parts of a given client's system are at different locations (e.g., part being at an on-site location and part being virtual), the systems may communicate via a network, such as a WiFi network 108.

A system can include multiple sub-systems. Each of the multiple sub-systems may (for example) be configured to perform a different type of operation, to use different resources (and/or different types of resources), to generate different types of outputs, to be located at different geographical locations, to correspond to (e.g., to grant access to) different agents or users (e.g., to different departments of an organization), and so on. For example, on-site client system 102 can include a first sub-system 110 and a second sub-system 112. First sub-system 110 can be configured to receive and respond to requests from user devices for content, and second sub-system 112 can be configured to dynamically monitor and re-configure network resources. First sub-system 110 and second sub-system 112 may communicate via WiFi network 108 or a local area network 114. Each of first sub-system 110 and second sub-system 112 can further communicate with a sub-system coordination resource 116. Sub-system coordination resource 116 may process data from each of one or more sub-systems to (for example) determine whether operation at one sub-system is consistent with operation at another sub-system or with system-level policies and/or to determine how one or more resources are to be allocated to a sub-system.

The implementation depicted in FIG. 1 illustrates various types of resources of systems. It will be appreciated that these resources are illustrative. Resources represented by separate blocks may, but need not, correspond to separate devices or groups of devices.

In the depicted instance, first sub-system 110 includes a content management resource 118, which is configured to query one or more data stores for content responsive to content requests and to transmit responses to content requests. For example, content management resource 118 may be configured to receive HTTP requests from a user device 119 and respond with webpage data. First sub-system 110 can further include a security resource 120, which may be configured to determine what data various users are authorized to receive and/or what types of actions various agents are authorized to make. For example, security resource 120 may receive or intercept a request from an agent device 122 to add or modify data in a content data store (e.g., stored locally at first sub-system 110 or remotely) and to determine whether such an addition or modification is allowed (e.g., based on an authentication of agent device 122 and/or information associated with the request).

First sub-system 110 also includes a processing resource 124, which can be configured to perform data processing, such as processing retrieved content (e.g., to convert it from a first to a second format or identifying particular content objects to retrieve in response to a request). First sub-system 110 further includes a scheduling resource 126, which may monitor incoming requests and identify when each request is to be processed (e.g., by managing a request queue).

Second sub-system 112 includes a performance monitor resource 128, which may assess a data log corresponding to requests being handled by first sub-system 110. The assessment may include monitoring a speed at which the requests are processed and an error rate. Results of the assessment can be transmitted to another agent device 130. A network configuring resource 132 can initiate various reconfigurations that may influence performance, such as server allocation. A reconfiguration may be automatically performed or performed responsive to a request from man agent device, such as agent device 130. An agent-initiated reconfiguration may require an authorization of the agent or agent device.

Client 2 system 104 includes an equipment resource 134 that may be configured to generate outputs. For example, equipment resource 134 may (for example) process inputs (e.g., parts, materials and/or input data) to generate a tangible product (e.g., a manufactured or assembled part) or intangible result (e.g., quantitative characterization of a sample or part, biological metric, environmental data, wireless signal characteristics, and so on). A sensor resource 136 can be configured to generate readings corresponding to an operation of equipment resource 134, such as an operating temperature and/or energy being used. A processing resource 138 can send instruction communications to equipment resource 134, which can control an operation of the equipment resource (e.g., to define inputs, identify types of processing and/or indicate when the resource is to operate). Processing resource 138 may determine such instructions in response to processing requests for particular outputs. Processing resource 138 may further or alternatively assess data corresponding to operation of equipment resource 134 (e.g., characteristics of output data, efficiency of product and/or sensor readings) to determine whether an alert condition is satisfied. In some instances, processing resource 138 operates so as to schedule operations at one or more equipment resources 134, schedule request processing and/or coordinate process control (e.g., via assessment of sensor measurements).

Agent device 140 may provide operation parameters and/or gain access to data. For example, an operation parameter may include or at least partly define a part of a workflow that is to occur (e.g., at least partly via equipment resource 134) as part of a processing of a request. In some instances, a local or remote security resource verifies that a particular agent device or corresponding agent is authorized to provide such parameters and/or gain access.

Virtual client system 106 includes various resources for a system that are, for example, operating in the cloud. In some instances, part or all of virtual client system 106 is identified as being or being used for or by an on-site sub-system (e.g., first sub-system 110 and/or second sub-system 112). A component may, but need not, be shared across two or more sub-systems. In some instances, part or all of virtual client system 106 corresponds to a separate sub-system from one, more or all on-site sub-systems. In some instances, virtual client system 106 includes multiple sub-systems.

In the depicted instance, virtual client system 106 includes a data storage resource 142, which may include databases and/or data stores for a client. The databases and/or data stores may be configured to facilitate periodic updating and/or retrieving data in response to queries generated and coordinated by a query resource 144. For example, a data store can include content objects managed by content management resource 118, and query resource 144 can be configured to generate a query for content objects from an external source (e.g., a source system 146). As another example, a data store can include historical operational data of one or more equipment resources 134 for client 2 system. As yet another example, a data store can include data corresponding to requests for particular types of outputs of equipment resource 134, such that queries of the data store (e.g., as performed using query resource 144) can be used to control operation parameters of equipment resource 134 to facilitate responsiveness to the requests.

A usage monitor resource 148 can generate data logs corresponding to (for example) incoming communications, internal system performance (e.g., of content retrieval or equipment operation) and/or system communications. For example, usage monitor 148 can generate and maintain a data log assessed by performance monitor resource 128 based on monitoring of requests and request responses processed by content management resource 118. As another example, usage monitor 148 can generate and maintain a data log of a quality metric and/or of maintenance events corresponding to equipment resource 134. As yet another example, usage monitor 148 can generate and maintain a data log of sensor measurements collected by sensor resource 136.

Another security resource 150 can assess system access requests, usage patterns, and/or system events to monitor for security threats. For example, a frequency, source and/or request content of content-object requests may be assessed. As another example, a data log is assessed to determine whether any patterns, trends and/or log-element frequencies are indicative of a security threat. As yet another example, security resource 150 may monitor equipment operation or agent instructions to determine whether any operations or instructions are atypical from one or more characteristics of previous instructions or correspond to satisfaction of an alert indication. When security resource 150 detects a potential threat decision, it may trigger an alert to be transmitted to an agent device, such as agent device 122, agent device 140, or an external agent device 152.

An allocation resource 152 can control which cloud resources are allocated to a given client, client sub-system, task performance, and so on. For example, allocation resource 152 can control allocation of memory, data stores (e.g., network attached storage), processors, and/or virtual machines.

Figure 2:
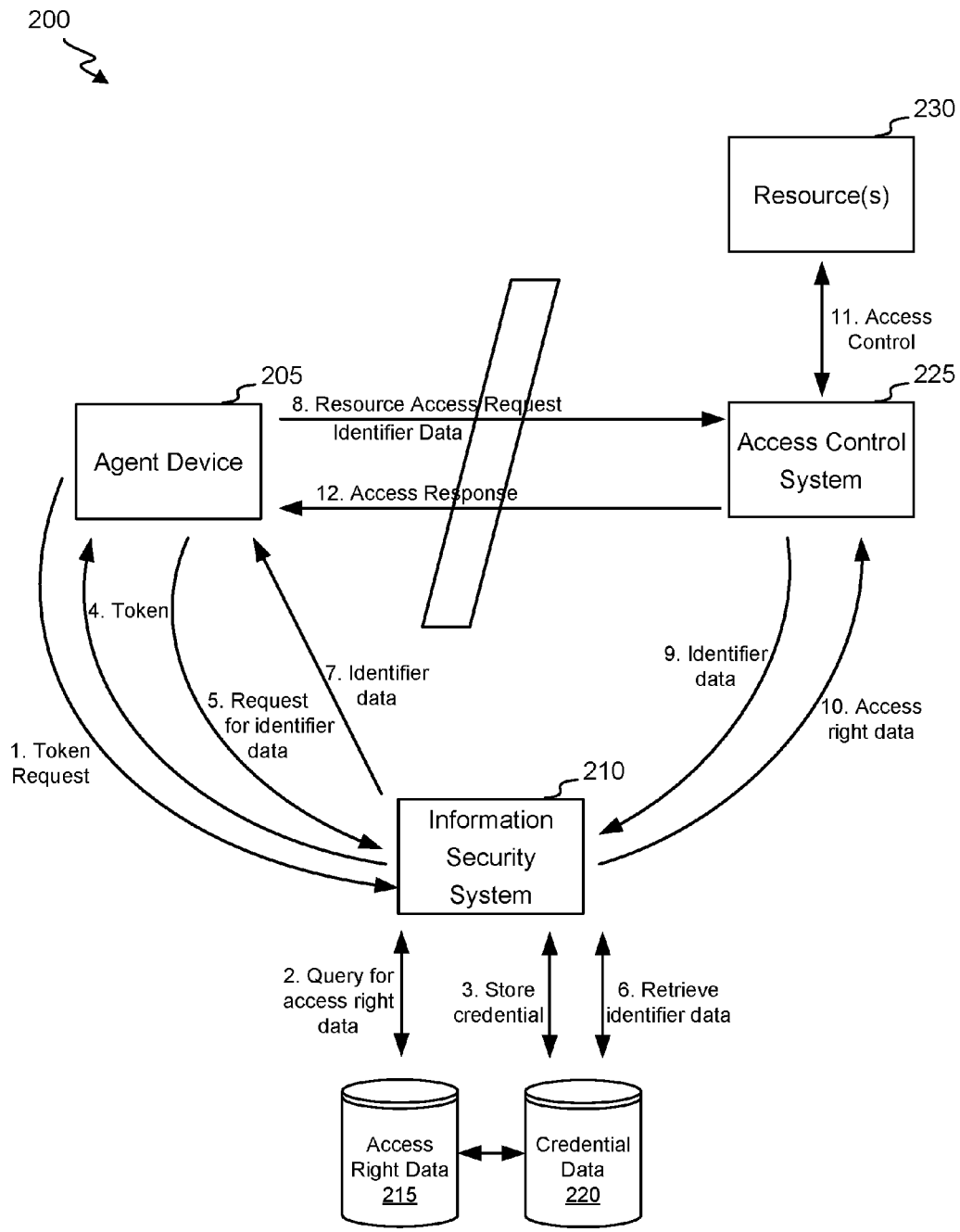
FIG. 2 shows an example interaction between devices and systems for processing resource access requests.

FIG. 2 shows an example interaction 200 between devices and systems for processing resource access requests. A first action can include an agent device 205 transmitting a request for a token to an information security system 210. Agent device 205 can correspond to a device of or being used by a human agent (e.g., an employee of an institution corresponding to a system), a non-human agent (e.g., executing code), or third-party user. Agent device 205 may, or may not, be located within a geographical area corresponding to a site or location of a system or institution at a time that the token request is transmitted. The requested token can correspond to a data element that is to be mapped to information including identifying and/or security information that may be used to determine whether requests from agent device 205 are to be granted.

Information security system 210 may, or may not, be located within a geographical area corresponding to a site or location of a system or institution at a time that the token request is received. For example, in an instance where information security system 210 is not located within such a geographical area, information security system 210 may be operating in the cloud. At a second action, information security system 210 can query an access right data store 215 for access right data corresponding to the request (e.g., to an agent or user identified in the request or to agent device 205). In some instances, other information in the request (e.g., identifying a type of agent or sub-system) can be used to identify the access right data.

The access right data may indicate what type of access is to be granted (e.g., by identifying one or more resources and/or one or more resource for which access is to be granted and/or by identifying one or more actions are to be permitted). Access right data can indicate or include (for example) one or more permissions, access constraints and/or access rules.

Using the access right data, information security system 210 can generate a credential for agent device 205. The credential can include and/or represent data or information corresponding to agent device 205 (e.g., data or information corresponding to a human or non-human agent). For example, the credential can include and/or represent a position of an agent, a type of an agent, and/or a level (e.g., experience level or learning level) of an agent. The information or data may be identified (for example) by content in the token request or via by using data elements from the request (or an associated communication) to identify the information or data. In some instances, the credential includes a statement, and the agent device corresponds to a principal, as further described (for example) U.S. application Ser. No. 11/225,993, filed on Sep. 14, 2005, which is hereby incorporated by referenced in its entirety for all purposes.

The credential can also or alternatively include and/or represent the access right data (or processed version thereof). For example, a part of the credential may indicate that the credential represents that the agent is authorized for Level 2 access of a first sub-system and Level 3 access of a second sub-system.

At a third action, information security system 210 stores the credential (e.g., in association with an identifier of agent device 205, an identifier of an agent corresponding to agent device 205, and/or a date and time. At a fourth action, information security system 210 transmits the token to agent device 205, which can store the token at the device. Subsequently, at a fifth action, agent device 205 transmits a request for identifier data to information security system 210. The request for identifier data can include the token. Information security system 210 can use the token and/or a characteristic of agent device 205 to retrieve the credential.

At a seventh action, information security system 210 transmits identifier device to agent device 205. In one instance, the seventh action includes the credential. In some instances, information security system 210 extracts identifier data from the credential and transmits the extracted identifier data at the seventh action. In some instances, information security system 210 dynamically selects or generates the identifier data and transmits the identifier data to agent device 205 at the seventh action.

The identifier information may include pseudo-identification data. For example, the identifier information may include an IP address and/or an agent name that corresponds to a unique, generated identity that (in some instances) does not or need not correspond to a real agent or agent device. Information security system 210 can associate the information with the credential, identifier of agent device 205 and/or identifier of an agent, such that access right data for the generated identity is set to correspond to that of the agent or agent device. Using this type of generated identity can convey important access-right data and conform to formats of request processing, while inhibiting discovery an identity of the agent or agent device (e.g., inhibit discovery of a name, IP address, street address of an agent or agent device).

In some instances, the identifier information accurately identifies information corresponding to the agent or agent device 205. However, the information may be selected and/or filtered in a manner to inhibit discovery an identity of the agent or agent device.

At an eighth action, agent device 205 transmits a request for access to a resource to an access control system 225. The request can include the identifier data. The resource can include a physical resource or electronic resource. For example, the request can be for entry to a building or for access to retrieve and modify data stored at a data-storage device. Access control system 225 may include a system located at an on-site location of a client and/or located in the cloud.

At a ninth action, access control system 225 transmits the identifier data to information security system 210 to determine whether the identifier data is authentic and (in some instances) to determine whether the identifier data indicates that agent device 205 or a corresponding agent is authorized for the requested access. Thus, at a tenth action, information security system 210 transmits access right data to access control system 225. For example, information security system 210 can use the identifier data to retrieve a credential for the agent device 205, and some or all of the access right data can be extracted or otherwise determined based on the credential. As another example, information security system 210 can use the identifier data to retrieve a credential and transmit the credential at the tenth action. As yet another example, the ninth action may include an indication as to what type of access is being requested, and information security system 210 can determine (based on a retrieved credential) whether the requested access is to be allowed.

At an eleventh action, access control system 225 controls a resource 230 so as to enable or inhibit access to the resource in accordance with the access right data. For example, access control system 225 may transmit an access request, retrieve data from resource 230 and/or add part or all identifier data to a whitelist. At a twelfth action, access control system 225 sends a response communication to agent device 205 that indicates whether access to the resource is granted. The response may include additional access-enabling information, such as a network address of a resource.

Thus, generating and using the credential can facilitate protection of an agent's or agent device's identity while simultaneously facilitating protection of a system from unauthorized access. It will be appreciated that various modifications are contemplated. For example, a token need not be generated, such that the first and fourth actions are omitted. As another example, the seventh action can include transmitting a credential indicative of which access rights are associated with the agent device, such that the ninth and tenth actions may be omitted. It will further be appreciated that the actions need not be performed in the order shown.

Figure 3:
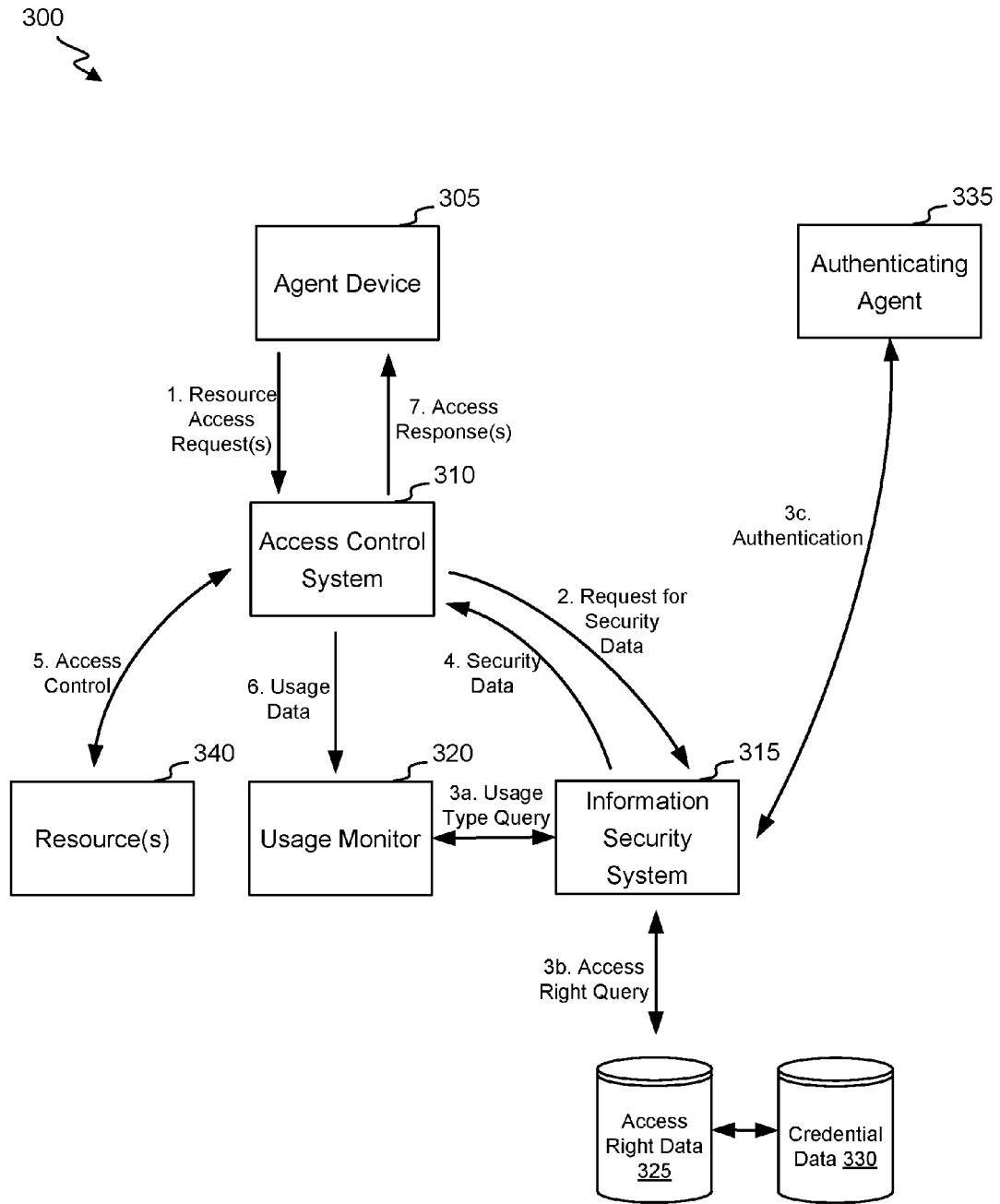
FIG. 3 shows an example interaction between devices and systems for processing resource access requests.

FIG. 3 shows an example interaction 300 between devices and systems for processing resource access requests. At a first action, an agent device 305 transmits a request for resource access to an access control system 310. The request can include one that corresponds to a request to initiate a session with an electronic environment or resource, a request to perform an action or access a resource during a session, or a request that is independent of a session. In some instances, the request is automatically generated in response to detecting a particular type of interaction or event associated with agent device. In some instances, the request is generate din response to input having been detected at agent device 305 corresponding to the resource-access request.

Agent device 205 can correspond to a device of or being used by a human agent (e.g., an employee of an institution corresponding to a system), a non-human agent (e.g., executing code), or third-party user. Agent device 205 may, or may not, be located within a geographical area corresponding to a site or location of a system or institution at a time that the token request is transmitted. Access control system 225 may include a system located at an on-site location of a client and/or located in the cloud. The resource may include (for example) an electronic or non-electronic resource, and the access may include physical access or an ability to retrieve, modify and/or store data.

At a second action, access control system 310 can send a request to an information security system 315 for security data pertaining to agent device 305. The request may include an identifier of agent device 305 and/or a corresponding agent (e.g., as extracted from the access request, as detected in metadata, as determined based on data or metadata in the request via a look-up table, as included in data or metadata in a previous communication from agent device 305 in a session, and so on). In some instances, the security data request includes an indication as to what resource access is being requested, such that the security data can indicate whether such access is authorized. In some instances, the security data includes more general access-right data (e.g., identifying generally whether agent device 305 is authorized to access a system, identifying which resources or resource types for which agent device 305 is authorized to access, and/or identifying what types of access is authorized).

In some instances, information security system 315 can collect other data to identify the security data. As one example, information security system 315 can request usage data from a usage monitor 320. Usage monitor 320 may detect, retrieve or otherwise identify data that indicates how and when agent device 305 and/or a corresponding agent accessed one or more resources and/or characteristics (e.g., dates, identified resources and/or responses) of any previous resource access requests received from agent device 305 and/or a corresponding agent. Usage data that indicates that a frequency of requests or accesses have exceeded an upper threshold or are below a lower threshold may indicate that an access right is questionable. Security threats having occurred after one or more past accesses may further indicate that an access right is questionable.

Information security system 315 may further or alternatively query an access right data store 325 with an identifier of agent device 305. The access-right query may be for an identification of what access rights are associated with agent device 305 and/or a corresponding agent or to indicate whether the requested access is authorized in view of the associated access rights. In some instances, the query can be for other data (e.g., a position and/or security level) that can be used to determine access rights. In some instances, determining access-right availability includes assessing a credential. For example, an identifier included in the resource-access request may have been generated to inhibit identity discovery. Thus, the access-right query may include retrieving information (e.g., access-right data and/or identifying data) associated with the credential.

In some instances, information security system 315 may communicate with an authenticating agent 335. The authenticating process can be selectively triggered when a condition is satisfied, such as detecting that agent device 305 and/or a corresponding agent is associated with one or more pre-identified roles or assignments, that agent device 305 the resource-access request is associated with a particular type of resource or interaction, or that a policy change has been initiated.

The communication may include requesting authenticating agent device 305 and/or a corresponding agent and/or requesting an indication as to whether resource access is to be enabled. For example, information security system 315 can transmit information corresponding to agent device 305 to authenticating agent 335, and authenticating agent 335 can indicate, in an authentication response, whether the agent device is recognized and authorized to access resources corresponding to a sub-system. The authentication response may identify or include a rule, policy or protocol to determine (e.g., at one or more times) whether agent device 305 and/or a corresponding agent is authorized for a particular type of access. The authentication response (or other associated data) may further or alternatively indicate a source device and/or agent of the authentication response and/or a characteristic (e.g., role and/or authentication level) of the source device and/or agent. As another example, the communication can include requesting and receiving an attestation of a principal corresponding to agent device 305, as further described in U.S. application Ser. No. 11/638,121, filed on Dec. 13, 2006, which is hereby incorporated by referenced in its entirety for all purposes.

At a fourth action, the security data is transmitted from information security system 315 to access control system 310. In some instances, one or both of information security system 315 and access control system 310 may use collected, retrieved and/or received data to generate processed security data (e.g., to transmit from information security system 315 to access control system 310 or determine whether access is to be granted). The processing may include applying an identified rule, policy or protocol to one or more characteristics associated with the request. The collected, retrieved and/or received data may have identified the rule, policy or protocol and/or may be used in the application of the rule, policy or protocol.

Thus, via one or more techniques (e.g., a look-up technique, usage-assessment technique, authorization technique and/or application of a rule, policy or protocol), it can be determined whether the requested resource access is to be granted. At a fifth action, access control system 310 controls a resource 340 so as to enable or inhibit access to the resource in accordance with this determination. For example, access control system 310 may transmit an access request, retrieve data from resource 340 and/or add part or all identifier data to a whitelist. At a sixth action, access control system 310 transmits usage data to usage monitor 320. The usage data may identify whether the request has been approved or denied, whether resource access has been enabled or inhibited, and/or whether (e.g., and how) agent device 305 has accessed resource 340.

At a seventh action, access control system 310 sends a response communication to agent device 305 that indicates whether access to the resource is granted. The response may include additional access-enabling information, such as a network address of a resource.

Figure 4:
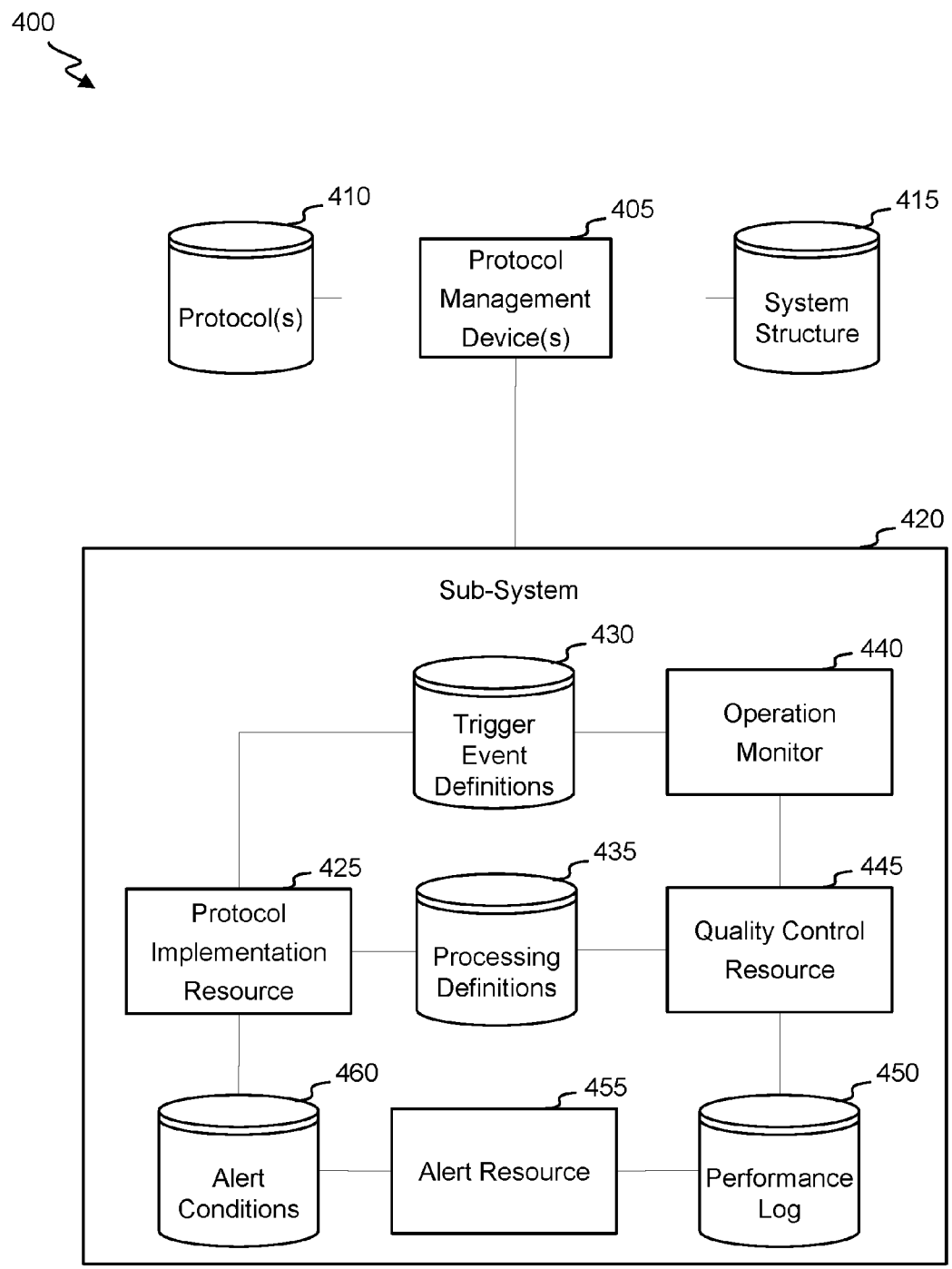
FIG. 4 shows an example block diagram of a system to support sub-system conformance of a system-wide protocol.

FIG. 4 shows an example block diagram of a system 400 to support sub-system conformance of a system-wide protocol. Each of one, more or all of the depicted components may be assigned to, at least partly allocated to and/or configured to perform operations or store data for a particular client. One or more protocol management devices 405 can manage one or more protocols that apply to system 400 and/or the client. A protocol can include, for example, a policy or rule. The protocol may identify target performance results (e.g., as individual values, categories and/or via one or more thresholds), which may pertain to (for example) a throughput, operation time or frequency, quality metric, and/or efficiency. The protocol may identify constraints on resource accesses (e.g., to pertain to agents and/or agent devices), such as indications as to which types of resources are available for use, types of permitted use and/or times of permitted use.

A protocol may be defined at least in part based on a transmission from an agent device (e.g., generated in response to detection of corresponding input). Protocol management device 405 may periodically modify the protocol (e.g., based on a new communication from an agent device authorized to initiate such modifications). Protocol management device 405 can store the protocol in a protocol data store 410. A system structure data store 415 may identify one or more sub-systems of system 400 and/or corresponding to a client. Sub-systems may differ from each with regard to (for example) types of operations performed, functionality, types of results generated, types of associated agents, specific associated agents, resource accessibility, and/or geographical locations.

Protocol management device 405 may avail one or more protocols to each of one or more sub-systems. For example, protocol management device 405 may transmit a protocol to each of one or more sub-systems, or protocol management device 405 may grant access to each of one or more sub-systems to access protocol sub-system. In some instances, each of one, more or all protocols applies to and/or is availed to each sub-system in system 400. In some instances, each of one, more or all protocols applies to an incomplete subset of sub-systems in system 400.

At given sub-system 420, a protocol implementation resource 425 may process a protocol 410 to generate an implementation (e.g., sub-policy) that applies more specifically to sub-system 420. For example, a more precise target performance result or constraint may be identified that is associated with an operation of sub-system 420. As another example, an intermediate metric may be identified, which may correlate or may potentially correlate with the target performance result or constraint, and the implementation may identify a target or constraint on the metric. As yet another example, an implementation may specify a parameter or process to facilitate compliance with the protocol.

As one particular example, an implementation may define one or more types of trigger events (with definitions stored in a trigger event definition data store 430) and a workflow process (with processing definitions stored in a processing definition data store 435) that is to occur in response to detecting a defined event. For example, a trigger event may include detecting a device interaction of a particular type (e.g., detecting a presence or communication from a new resource or agent device, receiving a new access request, and/or detecting that one device of sub-system 420 is attempting to write data to a data store), detecting a data change (e.g., via an alert from a sub-system device or via detecting a change in a data store, such as a modification of a previously stored data element or a storing of a new data element), detecting a change in an availability status of a resource, detecting at least a threshold number of resource-operation errors, and so on. In one instance, the implementation includes a sub-policy, and a workflow includes one or more executable rules to be automatically processed upon detecting a trigger event, as further described in U.S. application Ser. No. 10/404,495, filed on Apr. 1, 2003, which is hereby incorporated by referenced in its entirety for all purposes. An operation monitor 440 can monitor operations and/or activities corresponding to sub-system 420 (e.g., resource performance, incoming communications, generated outputs, etc.) to determine whether any trigger event is detected.

When a trigger event is detected, quality control resource 445 can retrieve one or more processing definitions from processing definitions data store 435 that correspond to a workflow associated with the event. In some instances, a workflow and/or processing definition indicates that one or more queries are to be performed. A processing definition may indicate (for example) a query parameter, such as what (e.g., which data store, resource or agent) is to be queried, what data elements are to be requested via the query (e.g., a constraint or question), and/or a format for the query. Using the processing definition(s), quality control resource 445 can generate a query (e.g., an electronic query or query document).

The query may also be generated based on the detected trigger event. For example, the query may identify particulars of the trigger event (e.g., time and date, associated resource, associated agent, associated interaction, associated data change, etc.) as a constraint for the query (e.g., for data retrieval) or as a subject of the query. For example, in response to detecting that an agent device is requesting a new type of resource access, the query may be generated so as to retrieve data for all previous resource accesses made by the agent device, or the query may be generated to request a role, authorization level and years of experience of an agent associated with the agent device.

In some instances, quality control resource 445 executes the query by communicating with one or more data stores. In some instances, quality control resource 445 facilitates execution of the query by transmitting the query to and/or facilitating presentation of the query at an agent device. The agent device may then detect agent input that corresponds to one or more responses, which it can transmit to quality control resource 445.

Quality control resource 445 may, but need not, process the data. For example, quality control resource 445 may identify a count of how many access records of a given type were retrieved from a data store. Quality control resource 445 can then update a performance log 450 to store the one or more responses (e.g., and/or a processed version of the one or more responses).

An alert resource 455 can monitor the performance log 450 and determine whether any updates to the log result in a satisfaction of an alert condition. For example, protocol implementation resource 425 may store one or more alert conditions in an alert conditions data store 460 that correspond to one or more processing definitions or workflows. An alert condition may be defined so as to detect circumstances that risk violation of a protocol or indicate that a violation of a protocol has occurred. Determining whether an alert condition is satisfied can include (for example) comparing one or more values from performance log 450 to one or more corresponding thresholds, determining whether a log entry includes one or more predefined variables, and/or detecting whether log entries are being added or modified in a manner distinguishable from a pattern corresponding to previous log entry modifications or additions.

When it is determined that an alert condition is satisfied, alert resource 455 can generate an alert communication. The alert communication may (for example) identify sub-system 420, one or more log entries (or data therein) corresponding to satisfaction of the alert condition, a date and time, and/or an identification of an alert condition that was satisfied. The alert communication may be (for example) transmitted to an agent device, which may be associated with sub-system 420 and/or protocol management device 405. For example, the agent device may include one authorized to modify a protocol. In some instances, the agent device (or corresponding agent) is identified in the alert condition. Transmission of the alert communication to the agent device (e.g., via a webpage, email, message, or other communication type) may cause an alert to be presented at the agent device. A corresponding agent may then investigate performance log 450, one or more processing definitions and/or other implementation details.

Figure 5:
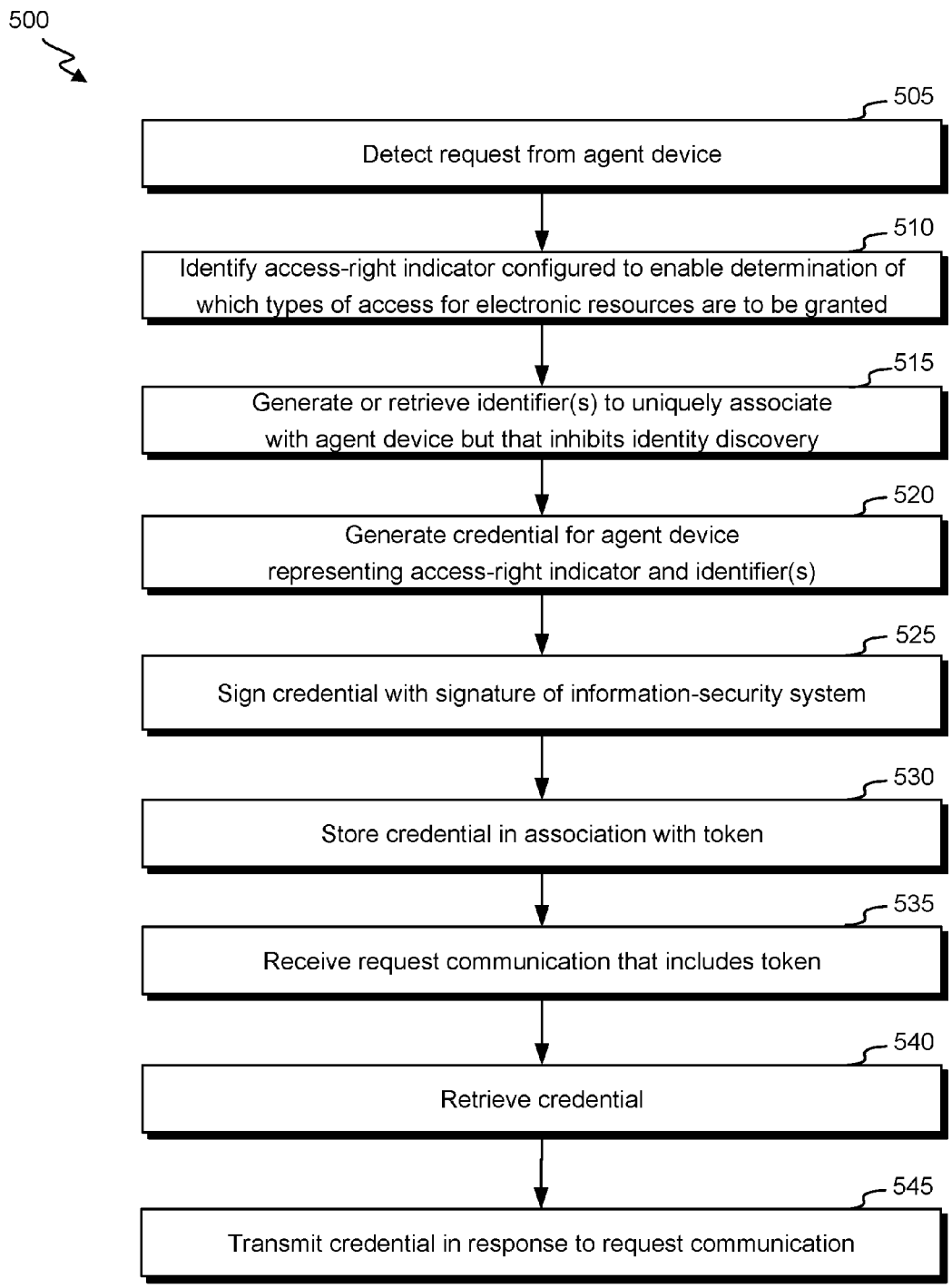
FIG. 5 shows a flow diagram of an example process for generating credentials to inhibit identity discovery and control resource access.

FIG. 5 shows a flow diagram of an example process 500 for generating credentials to inhibit identity discovery and control resource access. Process 500 may be performed (for example) in part or in its entirety at an on-site client system or a remote system (e.g., a virtual client system). Process 500 may be performed (for example) in part or in its entirety by a security resource, information security system and/or access control system.

At block 505, a request from an agent device is detected. The request can include a request to access a system, sub-system or resource; a request to perform an action; a request for a token corresponding to authentication data; and/or a request for a credential corresponding to authentication data. The request may include an identifier of the agent device and/or a corresponding agent (e.g., an IP address of the agent device, a name of the corresponding agent, and/or a position within an institution of the agent). The request can include one detected (for example) via a webpage or app page and have been initiated by input from the agent.

At block 510, an access-right indicator for the agent device is identified. The access-right indicator can be configured to enable a determination as to which types of access are to be granted with respect to one or more electronic resources are to be granted. The access-right indicator may be identified (for example) by looking up an identifier of the agent or agent device or transmitting a request for the access-right indicator to a resource or authorizing agent device.

At block 515, one or more identifiers are generated or retrieved that are to be uniquely associated with the agent device. The one or more identifiers may also inhibit discovery of an identity of an agent corresponding to the agent device. For example, the one or more identifiers may omit identifying information, such as a name, identifying number (or alphanumeric code) or address. In some instances, the one or more identifiers are generated using a pseudo-random technique.

At block 520, a credential is generated for the agent device. The credential represents the access-right indicator and the one or more identifiers. For example, the credential may include the access-right indicator and/or the one or more identifiers. As another example, the credential may be associated with the access-right indicator and/or the one or more identifiers in a data store.

At block 525, the credential is signed with a signature of an information-security system. At block 530, the credential in association with a token in a data store. The token can include (for example) a generated data element (e.g., an alphanumeric code). The token can be transmitted to the agent device, such that the credential can later be retrieved in response to receiving the token.

At block 535, a request communication that includes the token is received. The request communication can include a communication having been generated in response to a detecting that the agent device was requesting access to a resource. The request communication may have been generated at and/or received from (for example) the agent device, another agent device, a resource, an access control system or an information security system. The request communication may correspond to a request for access-right data, authentication data and/or part or all of the data.

At block 540, the credential is retrieved from the data store. In some instances, the credential is dynamically modified. For example, a query may be performed to identify most recent access rights associated with the agent. As another example, a credential element can be added or modified that corresponds to a dynamic representation of a type of authentication or access right associated with the agent.

At block 545, the credential is transmitted in response to the request communication (e.g., to the agent device, another agent device, resource, access control system or an information security system). In some instances, block 545 includes transmitting only a part (e.g., an extracted part) of the credential. A receiving device can then transmit the credential to another device to be used (e.g., for authentication or access-right determinations) and/or may locally assess the credential (e.g., for authentication or access-right determinations). For example, one exemplary assessment may include verifying that the credential is signed by the information-security system, identifying the access-right indicator from the credential, and determining whether the agent device is authorized for a particular type of resource access.

Figure 6:
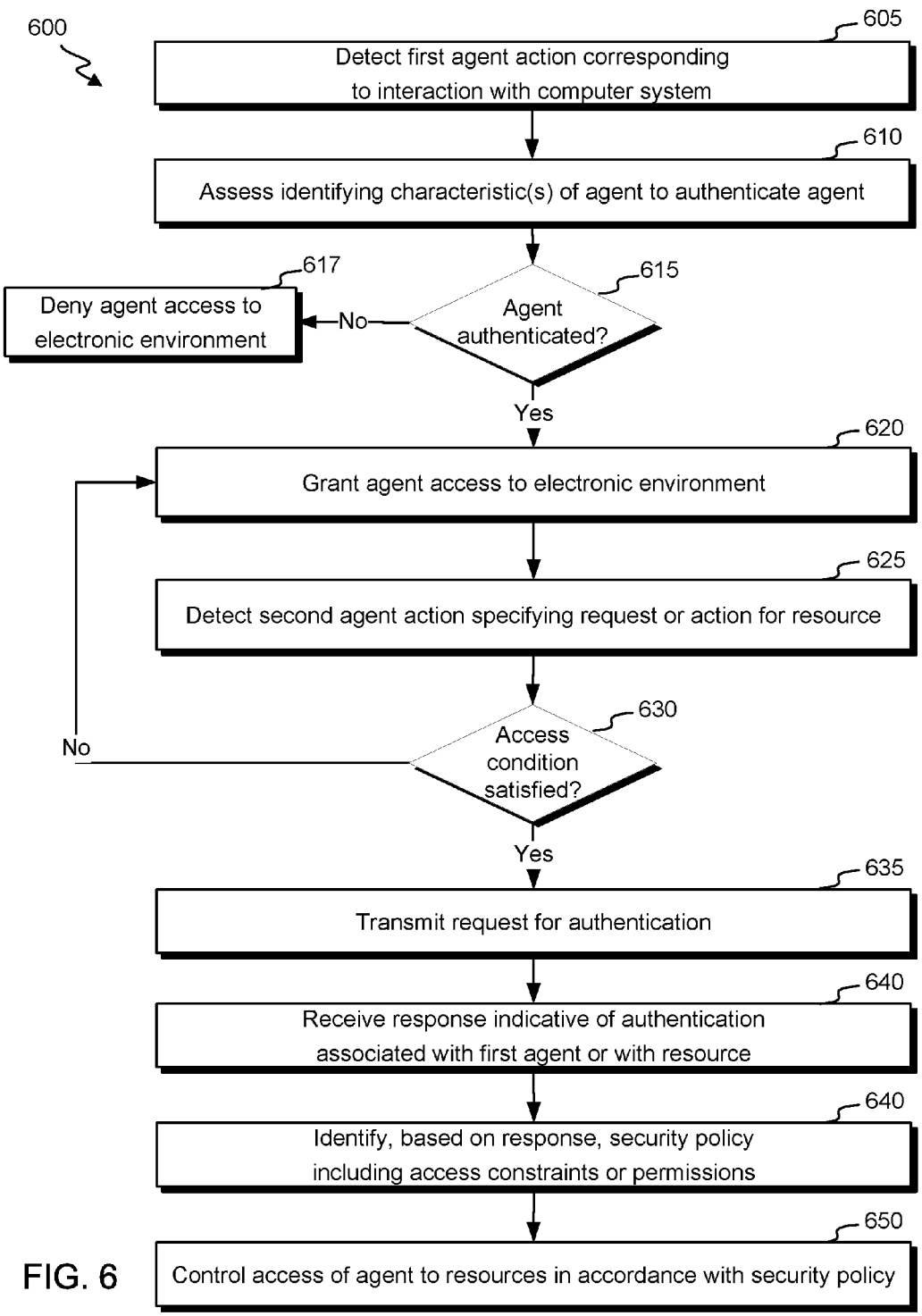
FIG. 6 shows a flow diagram of an example process for processing resource access requests via conditioned authentication communications.

FIG. 6 shows a flow diagram of an example process 600 for processing resource access requests via conditioned authentication communications. Process 600 may be performed (for example) in part or in its entirety at an on-site client system or a remote system (e.g., a virtual client system). Process 600 may be performed (for example) in part or in its entirety by a security resource, information security system and/or access control system.

At block 605, a first action of an agent device is detected. The first action corresponds to an interaction with a (e.g., remote) computer system (e.g., a client computer system) that at least partly controls access to one or more resources. The resource(s) can include an electronic or non-electronic resource. An interaction may include (for example) request to access a resource of the computer system, a modification of data, a provision of an instruction, a request to initiate a transaction, and so on.

At block 610, one or more identifying characteristics of the agent are assessed to authenticate the agent. The one or more identifying characteristics may have been (for example) included in a communication corresponding to the interaction, previously provided by the agent device, retrieved from a data store using an identifier of the agent device. The one or more identifying characteristics can include (for example) a name of the agent, a pseudonym of the agent, an alphanumeric code associated with the agent (e.g., having been previously generated by or for the computer system), login information received from the agent device, a role (e.g., position or occupation) of the agent, a level of access authorized for the agent, and/or one or more tasks having been assigned to the agent.

At block 615, it can be determined, based on the identifying characteristic(s), whether the agent is authenticated. The determination may include determining whether the identifying characteristic(s) indicate that the agent is to be granted access to an electronic environment of the computer system. The determination may include (for example) determining whether the identifying characteristic(s) correspond to one or more data elements in a predefined data structure (e.g., whether a login name and password corresponds to a stored pair of login name and password). The determination may include (for example) determining whether prior usage and/or initializing data associated with the agent indicates that the agent is authenticated.

When it is determined that the agent is not authenticated, at block 617, the agent may be denied access to an electronic environment of the system. For example, a request corresponding to the interaction may be denied, an access-rejection communication may be transmitted to the agent device, an action performed by the agent device may be reversed, and so on.

When it is determined that the agent is authenticated, at block 620, the agent is granted access to the electronic environment of the system. For example, a request corresponding to the interaction (e.g., to view, query or edit data in a data store or to transmit a resource instruction) may be granted, an action at least partly defined in the interaction may be performed or initiated, and/or an access-approval communication may be transmitted to the agent device.

At block 625, a second action of the agent device is detected. The second action may specify a request pertaining to a resource and/or specify (e.g., at least partly define) an action for a resource. In some instances, the second action is of a type that differs than the interaction of block 605. For example, approval of a request of the second action may require the agent to have a different level or type of authentication than required for the authentication at block 615 and/or to be granted access at block 620. To illustrate, approval of a request of the second action may require that the agent have been assigned to one or more roles not required for authentication at block 615 and/or for access to be granted at block 620.

At block 630, it is determined whether an access condition associated with the second action is satisfied. The access condition may be defined so as to be satisfied when an action is detected that is associated with a new type of authentication review. Thus, even though an agent device may have been previously granted access to a system, detecting an action or request that is associated with a stricter authentication requirement may satisfy the condition. Various predefined rules, look-up tables and/or machine-learning results may indicate what types of actions are associated with the new type of authentication review.

When it is determined that the access condition is satisfied, at block 635, a request for authentication is transmitted. The request can be transmitted to (for example) a device of an agent, a resource device, a device managing credentials for agents, a device configured to generate an authorization result in response to locally detecting input from a human agent, and/or a device configured to automatically generate an authorization result (e.g., without locally detecting input from a human agent). The request can identify (for example) the agent device, the agent, the second action, the access condition, and/or one or more characteristics (e.g., one or more identifying characteristics identified at block) of the agent or agent device. The request can be indicative of request for an attestation that the response that indicates whether the agent device is associated with an agent having a particular role, associated with an identity having a particular characteristic (e.g., being on a whitelist or not being on a blacklist), and/or associated with an access right to perform the second action or another action associated with the second action. (For example, the second action may include a request to access a data store, and the authorization request may be requesting an indication as to whether the agent device is authorized to access the data store.)

At block 640, a response to the request is received that is indicative of an authentication associated with the first agent or with the resource. For example, the response may indicate that information corresponding to the agent device is authenticated as corresponding to a true identity and/or credential, that an agent device is associated with a role of one or more particular roles that are authorized for the second action or an associated action, or that an agent device or corresponding agent is associated with an access right that permits performance of the second action or an associated action. The response may be signed by a source device and/or may include a security policy.

At block 645, a security policy is identified based on the response. The security policy includes one or more access constraints and/or permission. The security policy may include (for example) one included in the response, one stored in a data store, one that is dynamically generated based on a present security risk, etc. In one instance, which security policy is identified is determined in part based on the second action, the agent device and/or authenticating data included in the response.

At block 650, access of the agent to one or more resources within the electronic environment is controlled in accordance with the security policy. For example, the control may include restricting which resources can be accessed, how resources can be accessed (e.g., for what types of tasks and/or with respect to what types of data), when resources can be accessed, and/or for how long resources can be accessed. Such control may depend on (e.g., via the policy) a role of the agent device as indicated in the response and/or an access-right characteristic of the agent device as indicated in the response.

Figure 7:
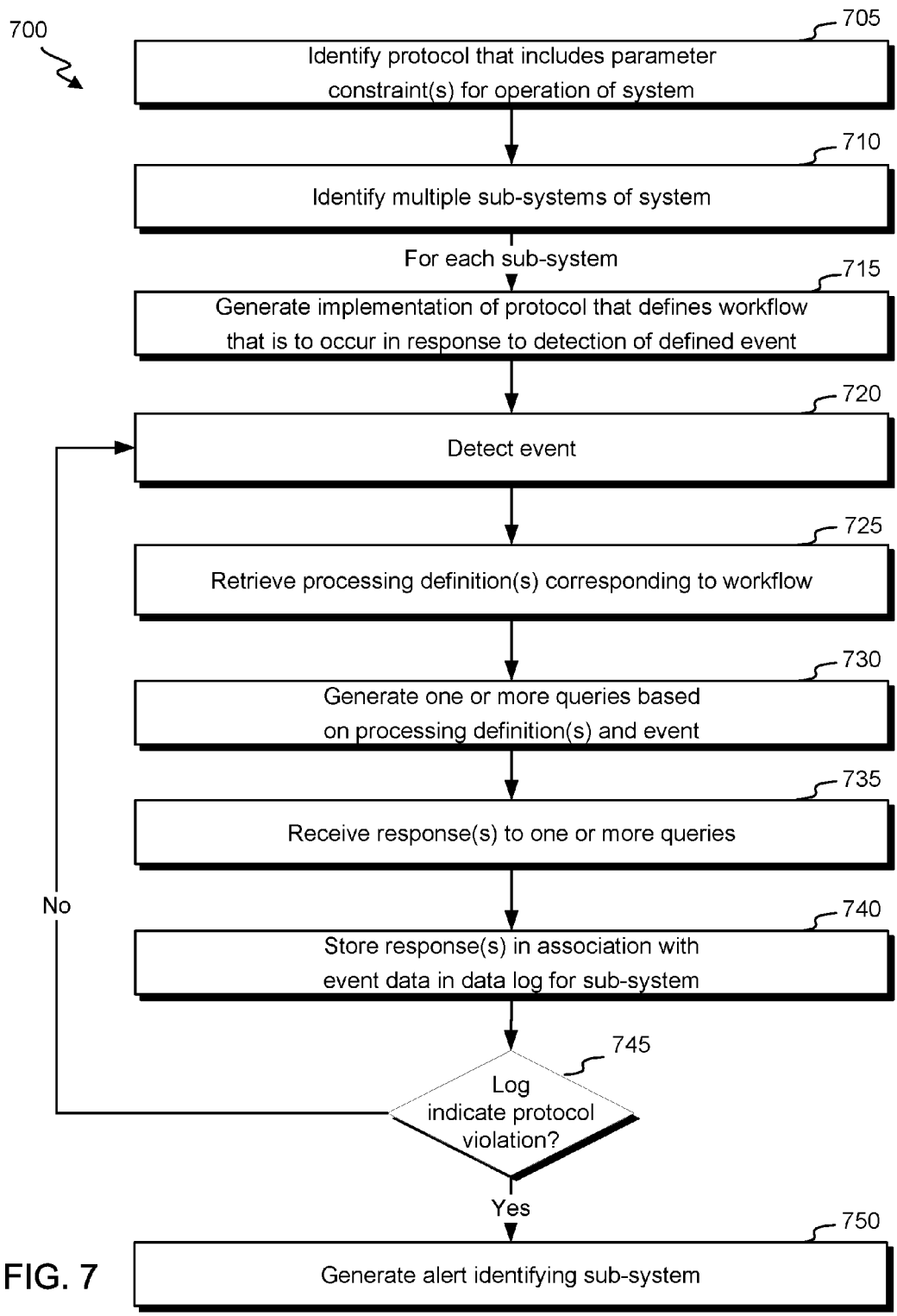
FIG. 7 shows a flow diagram of an example process for facilitating information security and sub-system operational conformance of a protocol.

FIG. 7 shows a flow diagram of an example process 700 for facilitating information security and sub-system operational conformance of a protocol. Process 700 may be performed (for example) in part or in its entirety at an on-site client system or a remote system (e.g., a virtual client system). Process 700 may be performed (for example) in part or in its entirety by a security resource, information security system and/or access control system.

At block 705, a protocol is identified that includes or identifies one or more parameter constraints pertaining to operation of a system. A parameter constraint may include, for example, a constraint on a performance result (e.g., specified as one or more individual values, categories and/or via one or more thresholds), which may pertain to (for example) a throughput, operation time or frequency, quality metric, and/or efficiency. A parameter constraint may include, for example, a constraint on resource accesses (e.g., to pertain to agents and/or agent devices), such as indications as to which types of resources are available for use, types of permitted use and/or times of permitted use. A protocol may have been defined at least in part based on input corresponding to human-provided specifications and/or based on an automated processing of past performance, such as via machine learning.

At block 710, a plurality of sub-systems within the system is identified. Each sub-system of the plurality of sub-systems can be configured to perform a different type of operation via access to and usage of different resources. For example, various sub-systems may use different servers to perform different types of data processing. In some instances, different sub-systems are also associated with different agents and/or agent devices.

Blocks 715-750 can then be performed for each sub-system of one, more or all of the plurality of sub-systems. At block 715, an implementation of the protocol is generated. The implementation of the protocol can be a workflow that is to occur in response to a detection at the sub-system of a defined event (e.g., trigger event). The defined event can correspond to one or more device interactions or data changes. The implementation can be defined (for example) so as to transform the protocol into actionable, automated process that applies to a unique environment and/or agent set of a sub-system. The implementation may be (for example) defined at least in part based on a transmission from an agent device corresponding to a role with an authority to define the implementation.

At block 720, one or more device interactions or data changes is detected that corresponds to the defined event. For example, communications, sub-system loads, resource operations, and/or data stores may be monitored to determine whether any such device interaction(s) or data change (s) are detected. An exemplary type of event-corresponding device interaction may include a request communication being received from an unrecognized agent device or from an agent device that is not located at an on-site client location. Another exemplary type of event-corresponding device interaction may include detecting an action from an agent device request that is not authorized for a role of a corresponding agent.

Yet another exemplary type of event-corresponding device interaction may include detecting a communication having been transmitted from a resource (e.g., a resource configured to perform data processing) and/or an agent device that indicates that a task (e.g., an automated, semi-automated or human-performed task) is complete or has been initiated or that identifies a characteristic of performance of a task (e.g., a completion time, a task duration, a task status, and/or a task result).

An exemplary type of data change may include any change to one of a set of predefined variables and/or a change that exceeds a threshold amount to a predefined numeric variable. As still another example, an event can correspond to at least a threshold number of data changes at a resource in the sub-system. As yet another example, an event can correspond to a data change that represents (for example) completion or initiation of a task (e.g., an automated, semi-automated or human-performed task) or a characteristic of performance of a task. To illustrate, data corresponding to a new index (representing a new task) may be added to a data structure.

A device interaction or data change detected at block 720 can include one that is initiated by (for example) execution of an application operating independently from and/or separate from another application for which execution facilitated or caused the detection at block 720 to be performed (and/or performance of one or more other blocks in process 700). For example, the application that initiated the device interaction or data change may be executing at a resource device or agent device and may facilitate performing a function associated with the sub-system. The application may be configured to provide an application programming interface.

In response to the detection, the workflow can be performed. Performing the workflow can include performing blocks 725-740. At block 725, one or more processing definitions corresponding to the workflow are retrieved from a data store. The processing definitions can identify (for example) data that is to be retrieved, generated and/or processed; a source or address of data; and/or one or more query parameters (e.g., question templates). As one particular illustration, a processing definition may indicate that 500 log events that preceded the detected event are to be retrieved from a given data store.

At block 730, one or more queries are generated based on the one or more processing definitions and based on the event. For example, a query template may be combined with data of the event and/or data retrieved, generated and/or processed based on the event. The queries may be, for example, executed by a local or remote device via automated processing (e.g., using an identified data store, a search technique, etc.), and/or by transmitting the query to an agent device to request input responses. At block 735, one or more responses to the one or more queries are received. At block 740, the one or more responses are stored in a data log for the sub-system in association with data corresponding to the event. The data log may selectively include event-triggered data or may also include other sub-system performance data.

At block 745, it is determined, based on the data log, whether a violation of the protocol has occurred. Determining whether the violation of the protocol has occurred can include determining whether an alert condition is satisfied. An alert condition may be defined in conjunction with a definition of an implementation or protocol or separately. An alert condition may be defined based on (for example) input from an agent or a machine-learning process (e.g., that detects what types of log events are correlated with policy violations). An alert condition may be satisfied (for example) when a log includes a particular type of response, when at least a threshold number of one or more particular types of responses, and/or when a trend of a given type of responses is detected (e.g., an above-threshold change or acceleration in a number of responses of a given type).

When it is determined that a violation of the protocol has not occurred, process 700 returns to block 720. When it is determined that a violation of the protocol has occurred, process 700 continues to block 750 where an alert is generated that identifies the sub-system and is indicative of a violation of the protocol having occurred. The alert may be transmitted to an agent device (e.g., associated with the sub-system, the implementation of the protocol, and/or the protocol).

Systems depicted in some of the figures may be provided in various configurations. In some embodiments, the systems may be configured as a distributed system where one or more components of the system are distributed across one or more networks in a cloud computing system.

Figure 8:
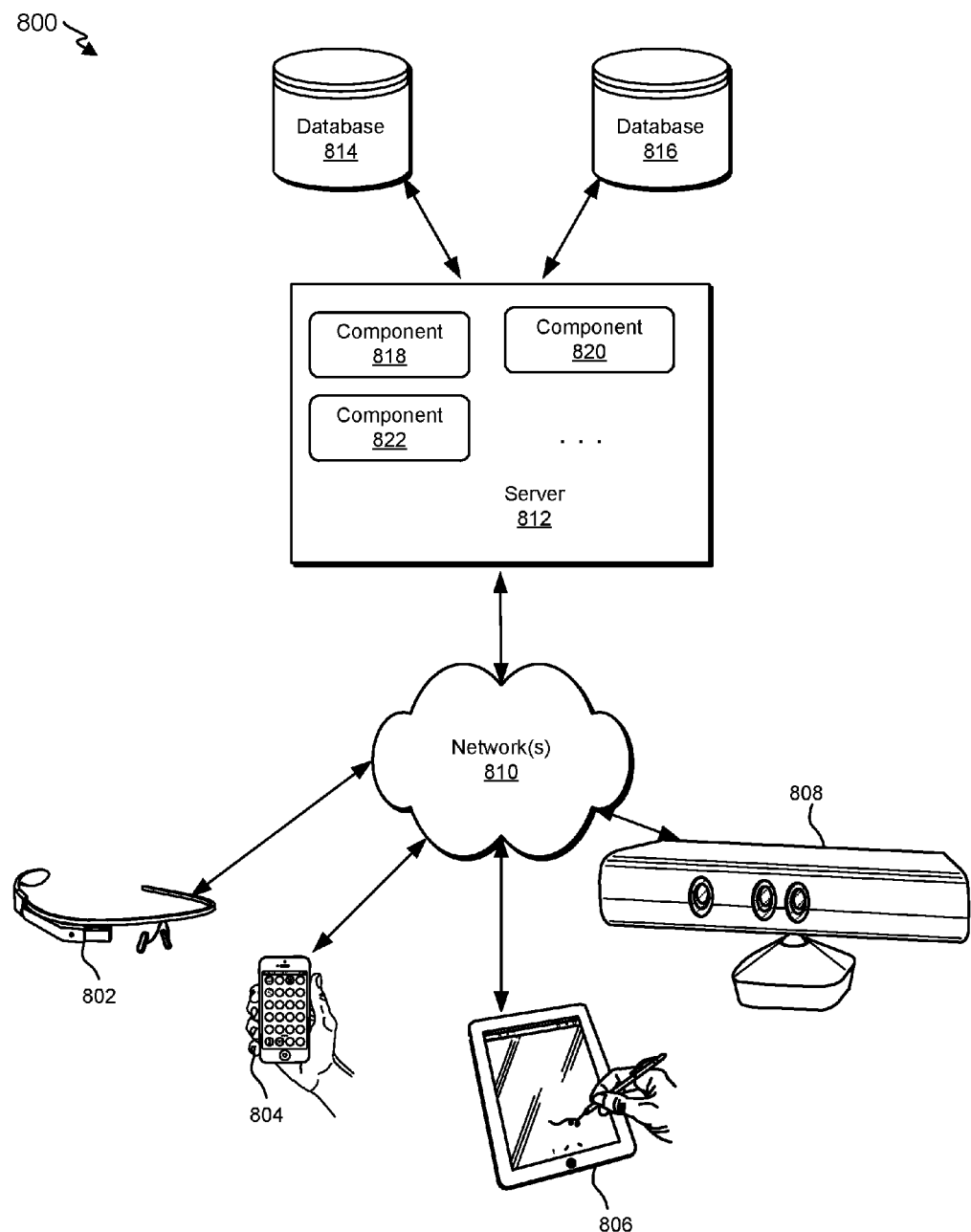
FIG. 8 depicts a simplified diagram of a distributed system for implementing one of the embodiments.

FIG. 8 depicts a simplified diagram of a distributed system 800 for implementing one of the embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications provided by one or more of the components of the system. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

Figure 9:
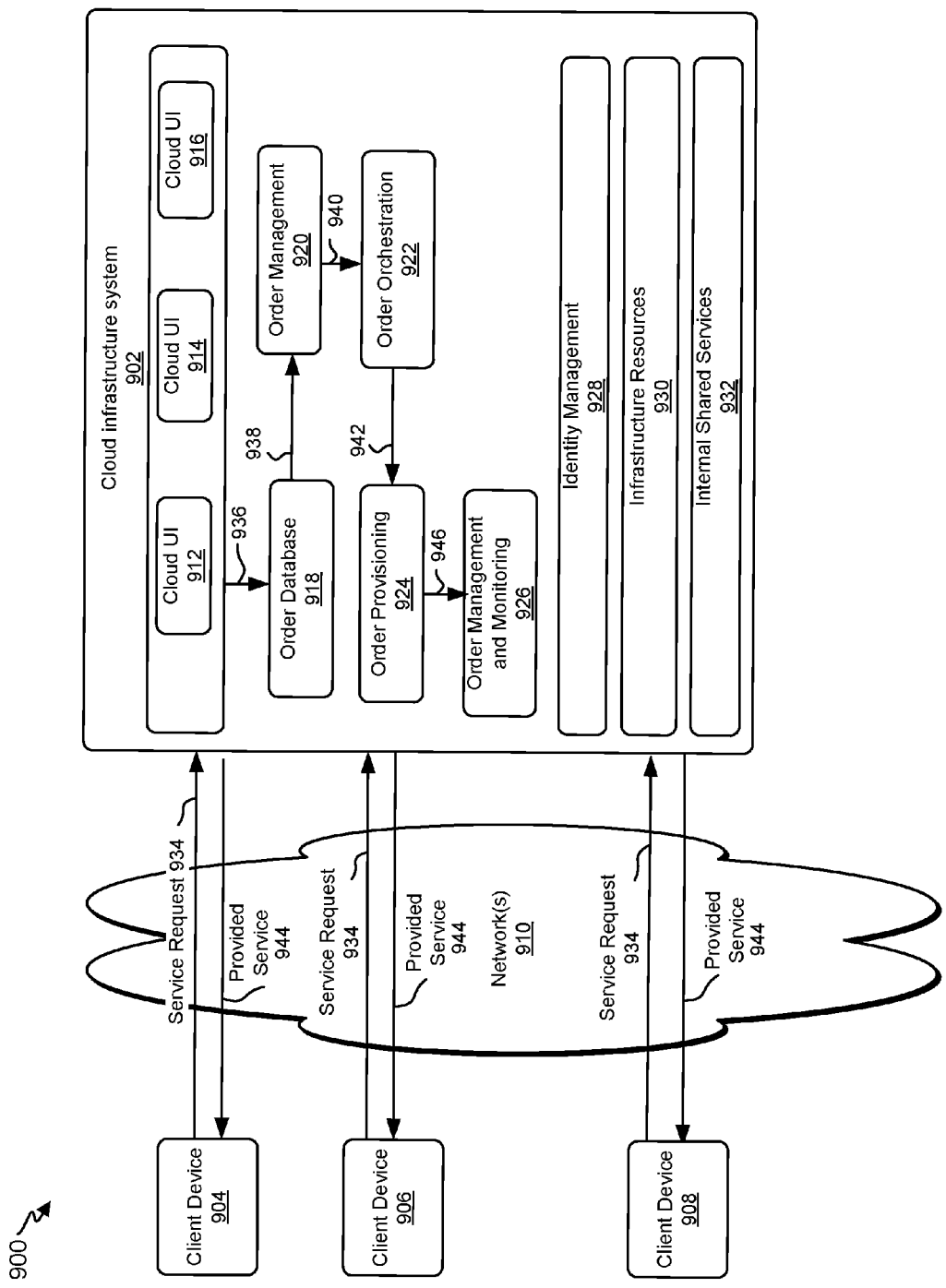
FIG. 9 is a simplified block diagram of components of a system environment by which services provided by the components of an embodiment system may be offered as cloud services, in accordance with an embodiment of the present disclosure.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
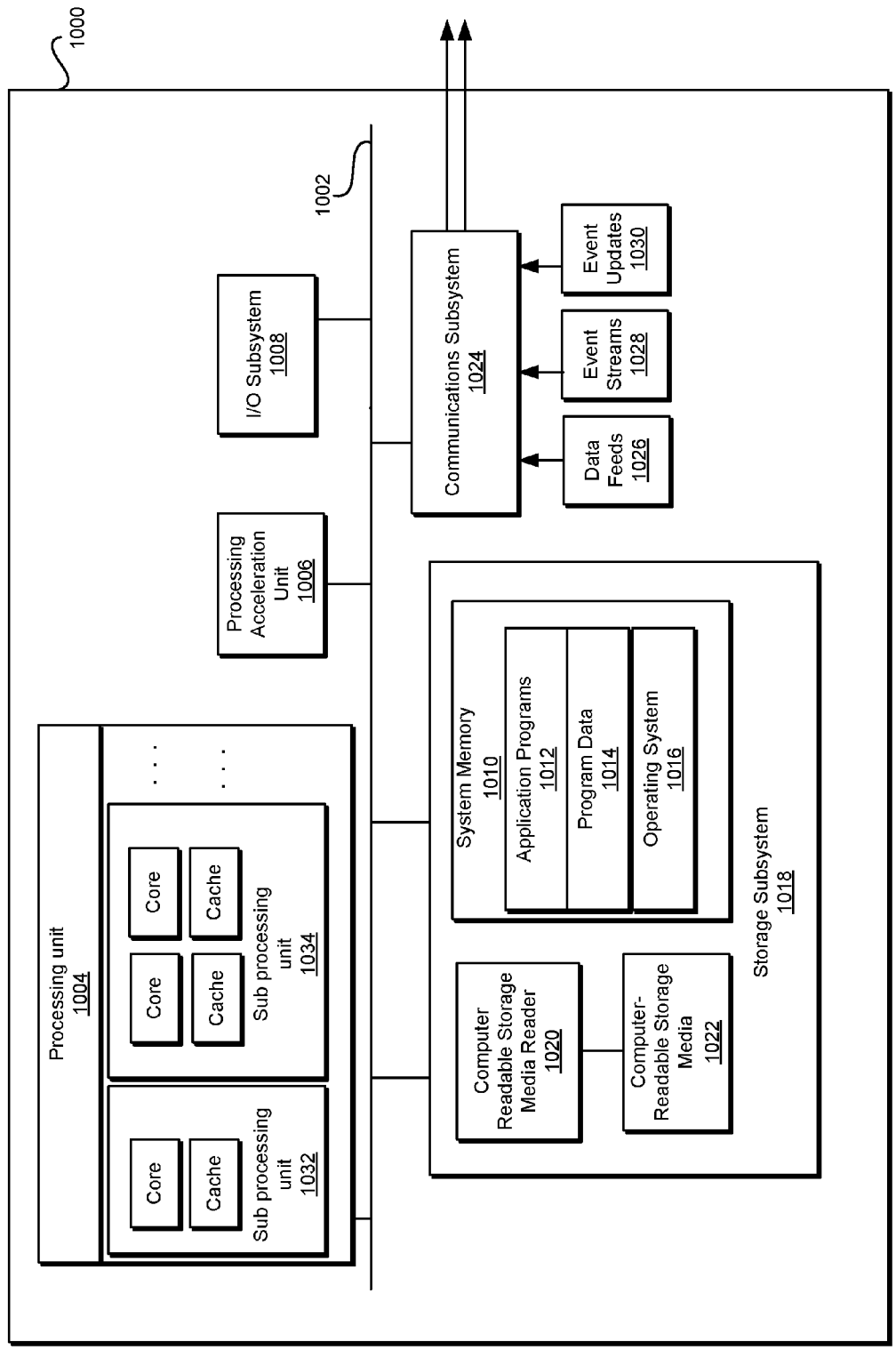
FIG. 10 illustrates an exemplary computer system, in which various embodiments of the present invention may be implemented.

FIG. 10 illustrates an exemplary computer system 1000, in which various embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A system for facilitating information security and sub-system operational conformance of protocols, the system comprising:
   one or more data processors; and
   a non-transitory computer readable storage medium containing instructions which, when executed on the one or more data processors, cause the one or more data processors to perform actions including:
      identifying a protocol that includes one or more parameter constraints pertaining to operation of a system;
      identifying a plurality of sub-systems within the system, each sub-system of the plurality of sub-systems being configured to perform different types of operations via access to and usage of different resources;
      for each sub-system of the plurality of sub-systems:
         generating an implementation of the protocol, the implementation of the protocol defining a workflow that is to occur in response to a detection at the sub-system of a defined event, the defined event corresponding to a device interaction or data change, wherein the implementation of the protocol transforms the protocol into an executable process that applies to each sub-system of the plurality of sub-systems;
         detecting one or more device interactions or data changes that corresponds to the defined event;
         in response to the detection, performing the workflow, the performance of the workflow including:
            retrieving one or more processing definitions corresponding to the workflow from a data store;
            generating one or more queries based on the one or more processing definitions and based on the defined event;
            receiving one or more responses to the one or more queries; and
            storing, in a data log for the sub-system, the one or more responses in association with data corresponding to the defined event;

determine, based on the data log, whether a violation of the protocol has occurred; and when it is determined that a violation of the protocol has occurred, generating an alert that identifies the sub-system and is indicative of a violation of the protocol having occurred, wherein the alert is transmitted to a device associated with the sub-system.

2. The system facilitating information security and sub-system operational conformance of protocols as recited in claim 1, wherein the actions further include:

receiving a communication from an agent device that identifies at least one of the one or more parameter constraints; and determining that the agent device is associated with an authorization to at configure system protocols, wherein the protocol is identified to include the at least one of the one or more parameter constraints in response to the determination that the agent device is associated with the authorization.

3. The system facilitating information security and sub-system operational conformance of protocols as recited in claim 1, wherein detecting the one or more device interactions or data changes that corresponds to the defined event includes detecting that a number of changes made to data elements in a data store exceeds a threshold as specified in the defined event.

4. The system facilitating information security and sub-system operational conformance of protocols as recited in claim 1, wherein detecting the one or more device interactions or data changes that corresponds to the defined event includes detecting a data change representation that a task being performed in association with the sub-system.

5. The system facilitating information security and sub-system operational conformance of protocols as recited in claim 1, wherein the one or more device interactions or data changes are initiated by an application executing independently from the execution of the instructions.

6. The system facilitating information security and sub-system operational conformance of protocols as recited in claim 1, wherein detecting the one or more device interactions or data changes that correspond to the defined event includes detecting that a definition of the workflow defined for the implementation has changed.

7. The system facilitating information security and sub-system operational conformance of protocols as recited in claim 1, wherein the instructions include first instructions of a first application and second instructions of a second application, wherein execution of the first instructions cause the one or more data processors to perform the workflow in response to the detection, and wherein execution of the second instructions cause the one or more data processors to determine whether a violation of the protocol has occurred.

8. A computer-program product tangibly embodied in a non-transitory machine-readable storage medium, including instructions configured to cause one or more data processors to perform actions including:

identifying a protocol that includes one or more parameter constraints pertaining to operation of a system;

identifying a plurality of sub-systems within the system, each sub-system of the plurality of sub-systems being configured to perform different types of operations via access to and usage of different resources;

for each sub-system of the plurality of sub-systems:

generating an implementation of the protocol, the implementation of the protocol defining a workflow that is to occur in response to a detection at the sub-system of a defined event, the defined event corresponding to a device interaction or data change, wherein the implementation of the protocol transforms the protocol into an executable process that applies to each sub-system of the plurality of sub-systems;

detecting one or more device interactions or data changes that corresponds to the defined event;

in response to the detection, performing the workflow, the performance of the workflow including:

retrieving one or more processing definitions corresponding to the workflow from a data store;

generating one or more queries based on the one or more processing definitions and based on the defined event;

receiving one or more responses to the one or more queries; and storing, in a data log for the sub-system, the one or more responses in association with data corresponding to the defined event;

determine, based on the data log, whether a violation of the protocol has occurred; and when it is determined that a violation of the protocol has occurred, generating an alert that identifies the sub-system and is indicative of a violation of the protocol having occurred, wherein the alert is transmitted to a device associated with the sub-system.

9. The computer-program product as recited in claim 8, wherein the actions further include:

detecting a communication from an agent device that identifies at least one of the one or more parameter constraints; and determining that the agent device is associated with an authorization to at configure system protocols, wherein the protocol is identified to include the at least one of the one or more parameter constraints in response to the determination that the agent device is associated with the authorization.

10. The computer-program product as recited in claim 8, wherein detecting the one or more device interactions or data changes that corresponds to the defined event includes detecting that a number of changes made to data elements in a data store exceeds a threshold as specified in the defined event.

11. The computer-program product as recited in claim 8, wherein detecting the one or more device interactions or data changes that corresponds to the defined event includes detecting a data change representation that a task being performed in association with the sub-system.

12. The system facilitating information security and sub-system operational conformance of protocols as recited in claim 1, wherein the one or more device interactions or data changes are initiated by an application executing independently from the execution of the instructions.

13. The computer-program product as recited in claim 8, wherein detecting the one or more device interactions or data changes that correspond to the defined event includes detecting that a definition of the workflow defined for the implementation has changed.

14. The computer-program product as recited in claim 8, wherein the instructions include first instructions of a first application and second instructions of a second application, wherein execution of the first instructions cause the one or more data processors to perform the workflow in response to the detection, and wherein execution of the second instructions cause the one or more data processors to determine whether a violation of the protocol has occurred.

15. A computer-implemented method for facilitating information security and sub-system operational conformance of protocols, the method comprising:
- identifying a protocol that includes one or more parameter constraints pertaining to operation of a system;
- identifying a plurality of sub-systems within the system, each sub-system of the plurality of sub-systems being configured to perform different types of operations via access to and usage of different resources;
- for each sub-system of the plurality of sub-systems:
  - generating an implementation of the protocol, the implementation of the protocol defining a workflow that is to occur in response to a detection at the sub-system of a defined event, the defined event corresponding to a device interaction or data change, wherein the implementation of the protocol transforms the protocol into an executable process that applies to each sub-system of the plurality of sub-systems;
  - detecting, using one or more processors, one or more device interactions or data changes that corresponds to the defined event;
  - in response to the detection, performing the workflow and using the one or more processors, the performance of the workflow including:
    - retrieving one or more processing definitions corresponding to the workflow from a data store;
    - generating one or more queries based on the one or more processing definitions and based on the defined event;
    - receiving one or more responses to the one or more queries; and
    - storing, in a data log for the sub-system, the one or more responses in association with data corresponding to the defined event;
  - determine, based on the data log, whether a violation of the protocol has occurred; and
  - when it is determined that a violation of the protocol has occurred, generating an alert that identifies the sub-system and is indicative of a violation of the protocol having occurred, wherein the alert is transmitted to a device associated with the sub-system.

16. The method facilitating information security and sub-system operational conformance of protocols as recited in claim 15, further comprising:
- receiving a communication from an agent device that identifies at least one of the one or more parameter constraints; and
- determining that the agent device is associated with an authorization to at configure system protocols, wherein the protocol is identified to include the at least one of the one or more parameter constraints in response to the determination that the agent device is associated with the authorization.

17. The method facilitating information security and sub-system operational conformance of protocols as recited in claim 15, wherein detecting the one or more device interactions or data changes that corresponds to the defined event includes detecting that a number of changes made to data elements in a data store exceeds a threshold as specified in the defined event.

18. The method facilitating information security and sub-system operational conformance of protocols as recited in claim 15, wherein detecting the one or more device interactions or data changes that corresponds to the defined event includes detecting a data change representation that a task being performed in association with the sub-system.

19. The method facilitating information security and sub-system operational conformance of protocols as recited in claim 15, wherein the one or more device interactions or data changes are initiated by an application executing independently from the execution of an application used to perform at least part of the method.

20. The method facilitating information security and sub-system operational conformance of protocols as recited in claim 15, wherein detecting the one or more device interactions or data changes that correspond to the defined event includes detecting that a definition of the workflow defined for the implementation has changed.

* * * * *

UNITED STATES PATENT AND TRADEMARK OFFICE
CERTIFICATE OF CORRECTION

PATENT NO. : 9,781,154 B1  
APPLICATION NO. : 15/275931  
DATED : October 3, 2017  
INVENTOR(S) : Stephen R. Carter et al.

Page 1 of 1

It is certified that error appears in the above-identified patent and that said Letters Patent is hereby corrected as shown below:

In the Drawings

Sheet 6 of 10, Figure 6:  
Line 24 (approximately), above box which states: "Identify, based on response, secureity policy including access constraints or permissions" or the second 640 in the figure:  
Remove "640" replace with --645--

In the Specification

In Column 1, Line 11:  
Remove "2002" and replace with --2003--

In Column 26, Lines 53 and 54:  
Remove "electronically" and replace with --electrically--

Signed and Sealed this  
First Day of January, 2019

Andrei Iancu  
*Director of the United States Patent and Trademark Office*